(12) United States Patent
Menadeva et al.

(10) Patent No.: US 9,047,532 B2
(45) Date of Patent: Jun. 2, 2015

(54) SYSTEM, METHOD AND COMPUTER PROGRAM PRODUCT FOR EVALUATING AN ACTUAL STRUCTURAL ELEMENT OF AN ELECTRICAL CIRCUIT

(75) Inventors: Ovadya Menadeva, Modiin (IL); Sergey Latinski, Modiin (IL)

(73) Assignee: APPLIED MATERIALS ISRAEL, LTD., Rehovot (IL)

( * ) Notice: Subject to any disclaimer, the term of this patent is extended or adjusted under 35 U.S.C. 154(b) by 1637 days.

(21) Appl. No.: 12/019,619

(22) Filed: Jan. 24, 2008

(65) Prior Publication Data
US 2008/0183323 A1  Jul. 31, 2008

Related U.S. Application Data

(60) Provisional application No. 60/886,639, filed on Jan. 25, 2007.

(51) Int. Cl.
*G06K 9/00* (2006.01)
*G06K 9/32* (2006.01)
*G06T 7/00* (2006.01)

(52) U.S. Cl.
CPC .............. *G06K 9/32* (2013.01); *G06K 2209/19* (2013.01); *G06T 7/0006* (2013.01); *G06T 7/0083* (2013.01); *G06T 2207/10056* (2013.01); *G06T 2207/30148* (2013.01)

(58) Field of Classification Search
CPC ............ G06K 9/46; G06K 9/68; G06F 17/50; G06F 9/45; G06T 2207/30148; H01J 2237/2817; H01J 37/28; H01L 22/12
USPC .................................................. 382/141–152
See application file for complete search history.

(56) References Cited

U.S. PATENT DOCUMENTS

| 6,067,375 | A | * | 5/2000 | Tsudaka | 382/144 |
| 7,120,285 | B1 | * | 10/2006 | Spence | 382/144 |
| 2002/0164064 | A1 | * | 11/2002 | Karklin et al. | 382/145 |

* cited by examiner

*Primary Examiner* — Chan Park
*Assistant Examiner* — Elisa Rice
(74) *Attorney, Agent, or Firm* — Kilpatrick Townsend & Stockton LLP

(57) ABSTRACT

A method, a system and a computer program product for evaluating an actual structural element of an electrical circuit. The method includes: detecting an actual structural element contour by processing a scanning electron microscope image of the actual structural element; aligning the actual structural element contour with a simulated contour to provide an aligned actual structural element contour; wherein the simulated contour is obtained by simulating a lithographic process that is responsive to a design contour; and comparing between the aligned actual structural element contour and reference information.

33 Claims, 12 Drawing Sheets

Histogram 182

Histogram 184

SYSTEM, METHOD AND COMPUTER PROGRAM PRODUCT FOR EVALUATING AN ACTUAL STRUCTURAL ELEMENT OF AN ELECTRICAL CIRCUIT

RELATED APPLICATIONS

The present patent application is a Non-Provisional of, claims priority to and incorporates by reference U.S. Provisional Patent Application No. 60/886,639, filed Jan. 25 2007.

FIELD OF THE INVENTION

This invention is generally in the field of automatic inspection of electrical circuits such as wafers or solar panels and especially for evaluating an actual structural element of an electrical circuit.

BACKGROUND OF THE INVENTION

Micro-electronic devices are often manufactured using masks (or reticles) in a lithography process. The latter is one of the principal processes in the manufacture of semiconductor devices, and consists of patterning the electrical circuit's surface in accordance with the circuit design of the semiconductor devices to be produced. Thus, a designed structural element (also referred to as a design structural element) should be converted to the actual structural element by the lithographic process. The lithographic process is highly complex and its parameters can vary from time to time. In addition, a mask that is illuminated in order to imprint the actual structural element is not ideal and can be characterized by variations between ideally identical mask elements.

The performance of micro-electronic devices has always been limited by the variations found in the dimensions of their actual structural elements. Various entities and methods have been used to measure critical dimensions (CDs) of such structural elements.

Recently a more detailed manner to evaluate microscopic structural elements has evolved. It includes obtaining a scanning electron microscope image of an actual structural element, detecting a contour of the actual structural element (referred to as an actual structural element contour) and comparing the actual structural element contour to a contour of a design structural element.

The comparison can be dramatically biased if the actual structural element and the design structural element are not aligned. Manual alignment is time consuming and not very accurate.

There is a need to provide efficient systems and methods for evaluating an actual structural element of an electrical circuit and especially for aligning the actual structural element.

SUMMARY OF THE INVENTION

A method for evaluating an actual structural element of an electrical circuit, the method includes: detecting an actual structural element contour by processing a scanning electron microscope image of the actual structural element; aligning the actual structural element contour with a simulated contour to provide an aligned actual structural element contour; wherein the simulated contour is obtained by simulating a lithographic process that is responsive to a design contour; and comparing between the aligned actual structural element contour and reference information.

A computer program product that includes a computer useable medium having a computer readable program, wherein the computer readable program, when executed on a computer, causes the computer to: detect an actual structural element contour by processing a scanning electron microscope image of the actual structural element; align the actual structural element contour with a simulated contour to provide an aligned actual structural element contour; wherein the simulated contour is obtained by simulating a lithographic process that is responsive to a design contour; and compare between the aligned actual structural element contour arid reference information.

A system, including: a memory unit adapted to store reference information; and a processor that is adapted to: detect an actual structural element contour by processing a scanning electron microscope image of the actual structural element; align the actual structural element contour with a simulated contour to provide an aligned actual structural element contour; wherein the simulated contour is obtained by simulating a lithographic process that is responsive to a design contour; and compare between the aligned actual structural element contour and reference information.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EXEMPLARY EMBODIMENTS

Fast, completely automatic and highly reliable manners of evaluating structural elements are provided. The alignment process is based upon simulated contours and can be executed in an automatic time-saving manner.

Figure 1:
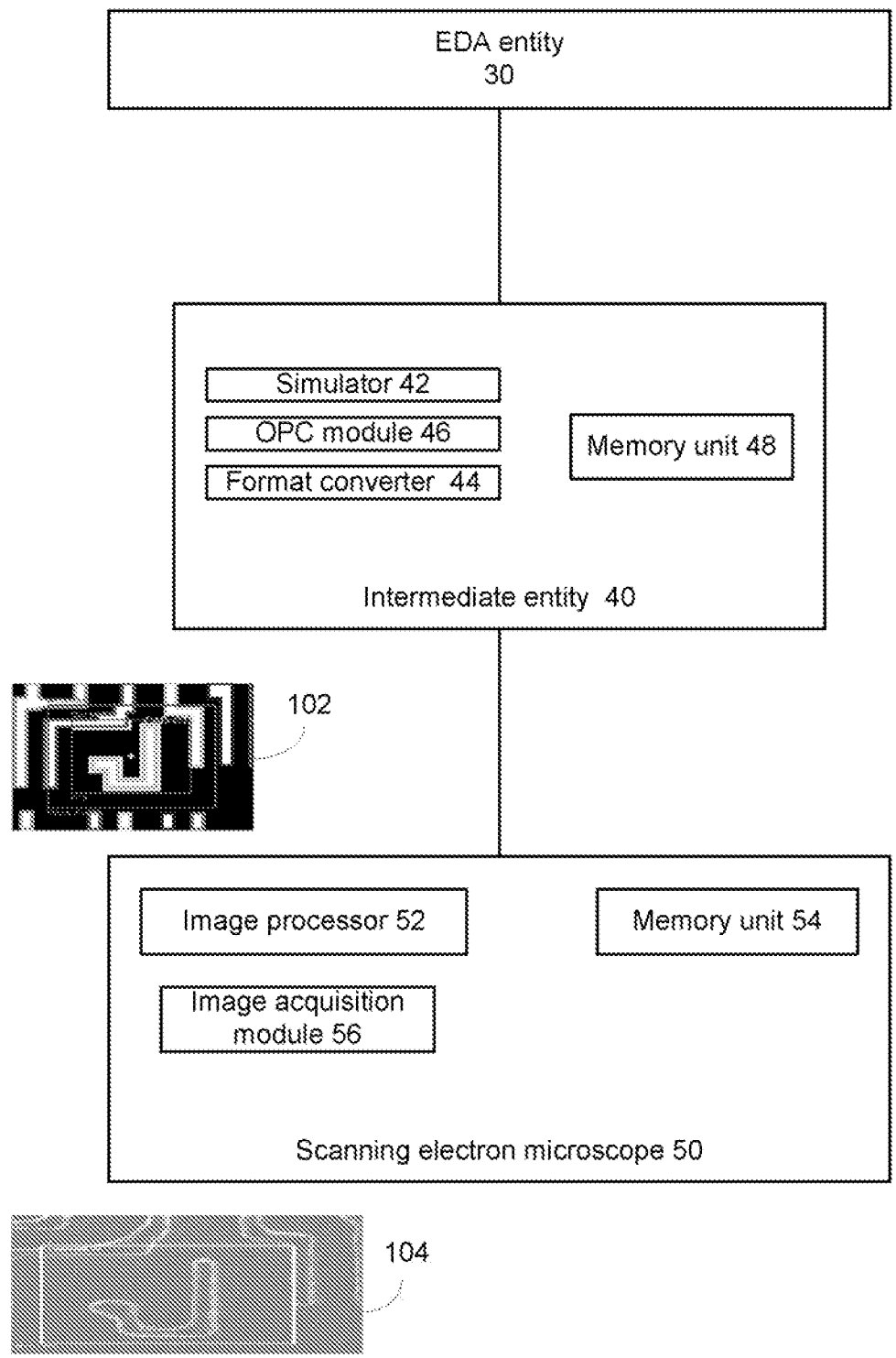
FIG. 1 illustrates an Electrical Design Automation (EDA) entity, an intermediate entity and a scanning electron microscope (SEM), a bit map and an SEM image of an actual structural element, according to an embodiment of the invention.

FIG. 1 illustrates EDA entity 30, intermediate entity 40 and scanning electron microscope (SEM) 50, bit map 102 and SEM image 104 of an actual structural element, according to an embodiment of the invention.

FIGS. 1-4 illustrate EDA entity 30, intermediate entity 40 and SEM 50 as being connected to each other. This connectivity can be a logical connectivity or a physical connectivity. These entities can be connected via one or more networks, links, and the like.

Intermediate entity 40 can include hardware, software and middleware or a combination thereof. It can be a stand alone computer, an OPC check station of Applied Materials, of Santa Clara, Calif. and can be integrated with either (electrical design automation) EDA entity 30 or SEM 50.

EDA entity 30 can be an EDA device, EDA system as well as EDA software.

EDA entity 30 can provide design information such as but not limited to design contours. The design information usually has a certain format that should be converted to an SEM-readable format. Intermediate entity 40 and especially format converter 44 performs this conversion. Bitmap 102 illustrates SEM-readable format design information. The bit map can be represented by a list of coordinates that define the design structural elements and especially design element contours. It is noted that the format conversion can be applied by either one of EDA entity 30 and SEM 50 or even by another device (that is not shown). SEM 50 acquires an SEM image of an actual structural element such as image 104.

Intermediate entity 40 can include memory unit 48, simulator 42, OPC module 46 and format converter 44. SEM 50 includes image processor 52, memory unit 54 and image acquisition module 56. It is noted that various boxes (such as but not limited to format converter 44, OPC module 46 and simulator 42) can be implemented by a processor that executes code.

Image processor 52 can perform at least one of the following stages: (i) detect an actual structural element contour by processing a scanning electron microscope image of the actual structural element; (ii) align the actual structural element contour with a simulated contour to provide an aligned actual structural element contour; wherein the simulated contour is obtained by simulating a lithographic process that is responsive to a design contour; and (iii) compare between the aligned actual structural element contour and reference information.

It is noted that the reference information can be the design contour, and additionally or alternatively, the simulated contour.

Figure 11:
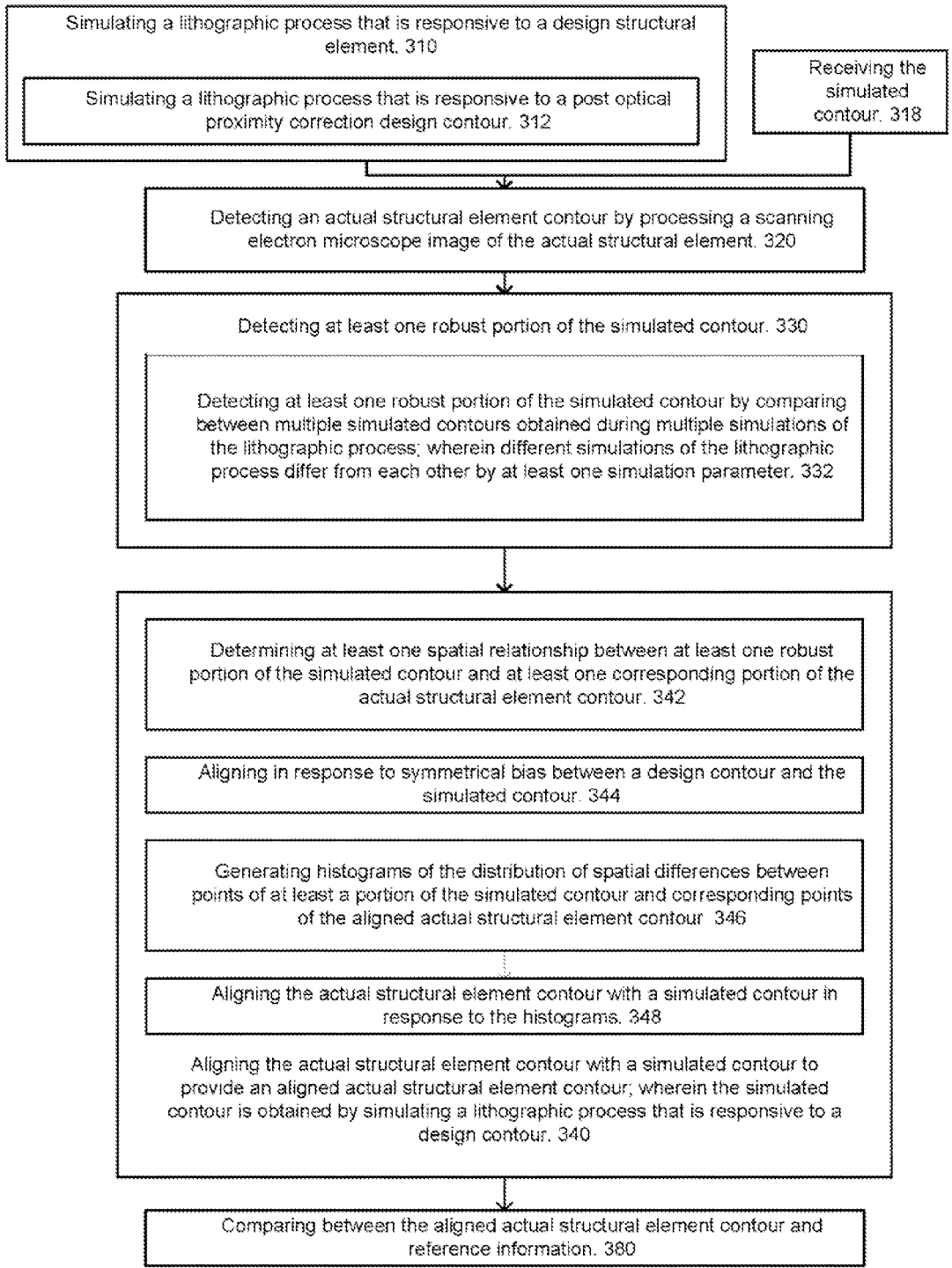
FIG. 11 is a flow chart of a method according to an embodiment of the invention.
Figure 12:
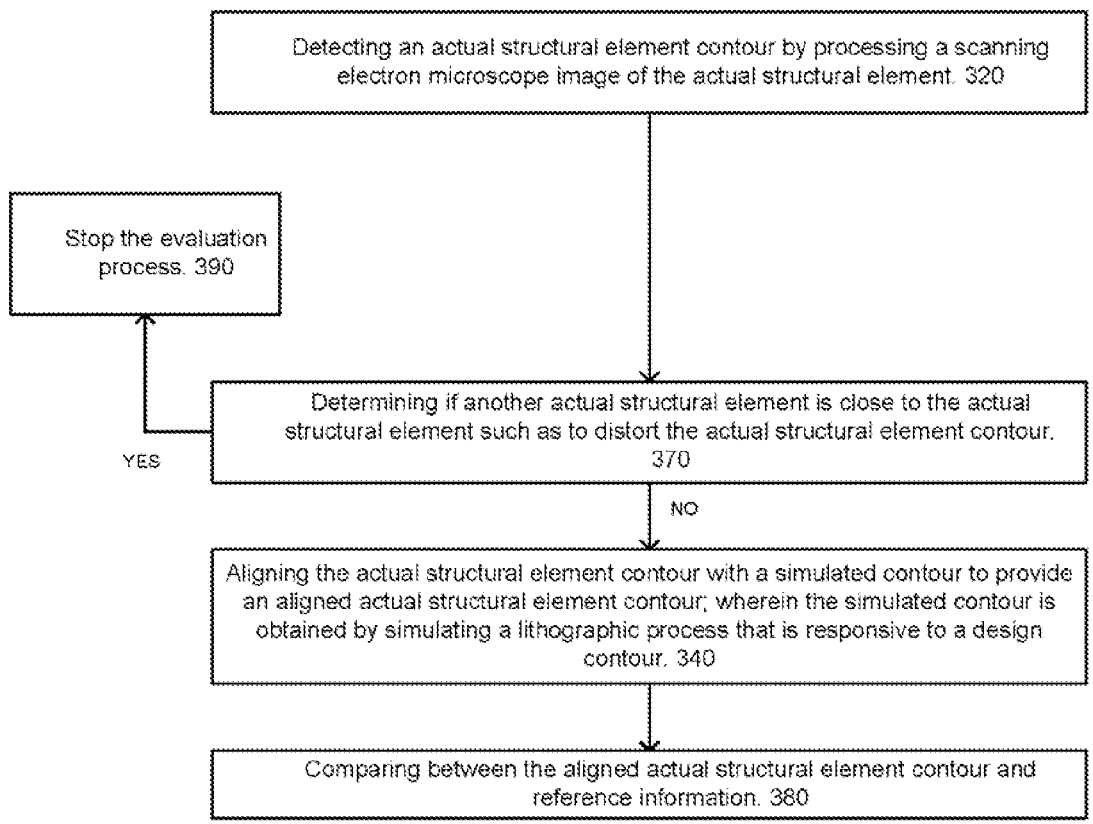
FIG. 12 is a flow chart of a method according to another embodiment of the invention.

Conveniently, image processor 52 can perform any stage of methods 300 and 302 of FIGS. 11 and 12. It is noted that image processor 52 can perform just some of the stages of methods 300 and 302 but this is not necessarily so. Different entities can participate in executing one or more stages of methods 300 and 302. For example, simulator 42 of intermediate entity 40 or simulator 70 (of FIG. 2) can perform stages 330 and 332 of method 300. According to yet another embodiment of the invention, image processor 52 can also perform this simulation.

Conveniently, simulator 42 obtains the simulated contour by simulating a lithographic process during which the actual structural element is expected to be manufactured. The simulating is responsive to a post optical proximity correction design contour. The post optical proximity correction phase is executed by OPC module 46. OPC module 46 receives design information from EDA entity 30 and can alter it in order to provide optical proximity corrections. These corrections can be applied to masks that are illuminated during the lithographic process.

According to an embodiment of the invention, image processor 52 performs the alignment by determining at least one spatial relationship between at least one robust portion of the simulated contour and at least one corresponding portion of the actual structural element contour. The spatial relationship can be expressed by multiple bias values.

A robust portion of the simulated contour is (i) a portion of the simulated contour that is not expected to substantially deviate due to simulation inaccuracies and/or (ii) is a simulated portion contour that corresponds to an actual structural element portion that is expected to be insensitive (or of low sensitivity) to lithographic process parameter changes. Line edges are not expected to be robust as these line edges tend to shrink or otherwise be distorted in a manner that is strongly affected by the exact (temporal) parameters of the lithographic process. Robust portions are less responsive to process variations.

It is noted that image processor 52 can detect at least one robust portion of the simulated contour. For example, it can detect the robustness of portions by comparing between multiple simulated contours obtained during multiple simulations of the lithographic process, wherein different simulations differ from each other by at least one simulation parameter. The simulation parameter can be radiation intensity, radiation polarization, direction of radiation, radiation coherency, focus conditions, frequency of radiation, shape of mask (and especially a shape of a mask structural element that when illuminated is expected to generate the actual structural element). The simulations can also differ from each other by the design contours that they are responsive to. Different simulations can be applied on different design contours.

Figure 7:
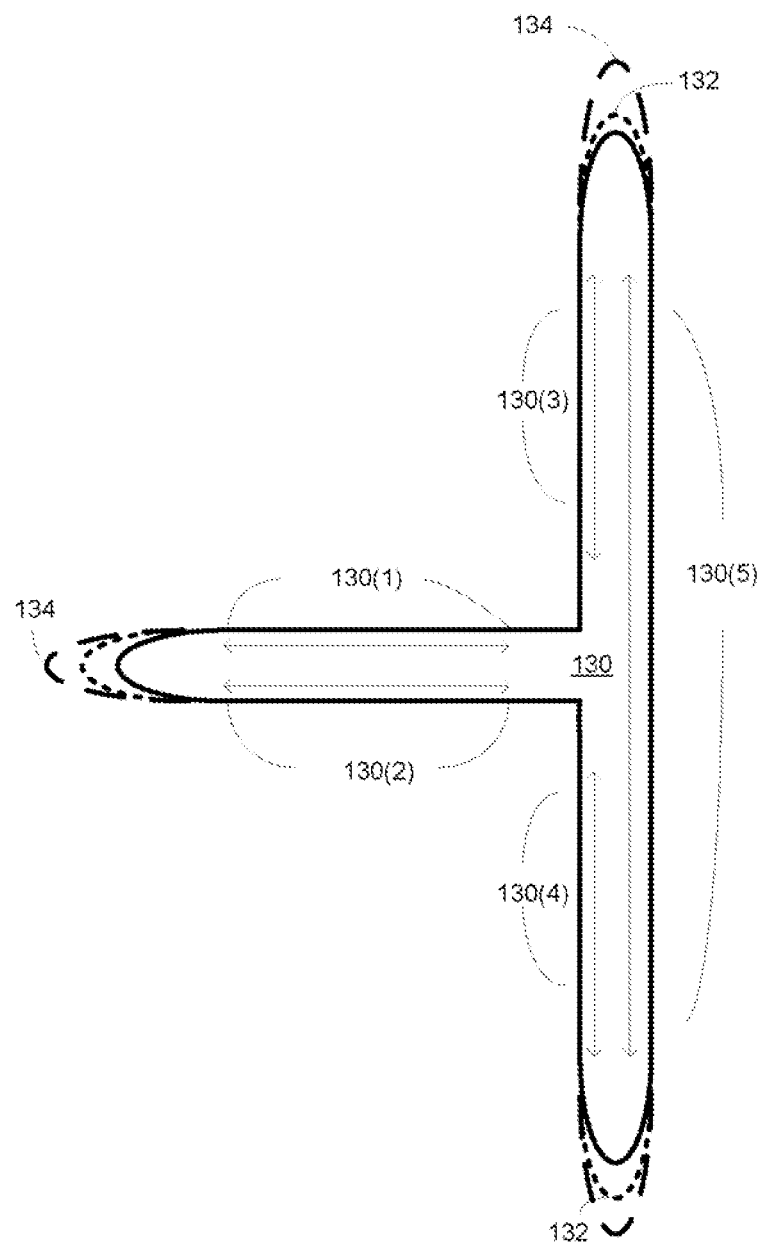
FIG. 7 illustrates simulated contours obtained during different simulations of a lithographic process according to an embodiment of the invention.

FIG. 7 illustrates three simulated contours 130, 132 and 134 obtained during different simulations of a lithographic process according to an embodiment of the invention. Contours 130, 132 and 134 partially overlap. The line edges of these three contours differ from each other; thus, they are not robust portions. Robust portions usually include relatively long straight lines such as 130(1), 130(2), 130(3), 130(4) and 130(5). Each of these robust portions can be compared to a corresponding portion of an actual structural element during the alignment process. It is noted that the alignment can include x-axis alignment and y-axis alignment. Portions 130(1) and 130(2) can be used during x-axis alignment while portions 130(2), 130(3) and 130(4) can be used during y-axis alignment.

Figure 8:
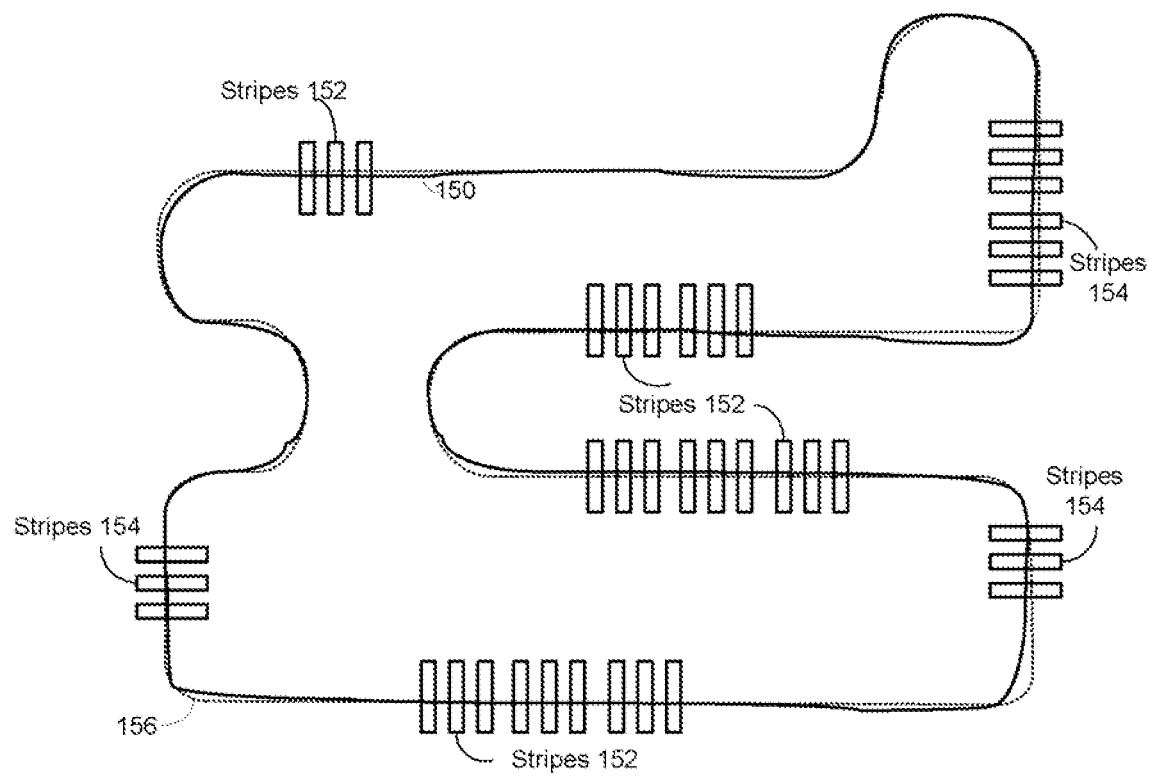
FIG. 8 illustrates an actual structural element contour and multiple alignment stripes according to an embodiment of the invention.

FIG. 8 illustrates an alignment between an actual structural element contour 150 and simulated contour 156. The alignment is based upon the examination of actual structural element pixels included in stripes 152 and stripes 154. Multiple stripes can be grouped together in order to detect the edge of actual structural element contour 150 and perform the alignment. All stripes are included in robust portions of simulated contour 156.

According to an embodiment of the invention, symmetrical biases between a simulated contour and a design contour can be detected and utilized during the alignment process. These symmetrical biases are expected to appear (even if slightly distorted) between the actual structural element contour and either one of the simulated contour and the design contour.

Figure 9:
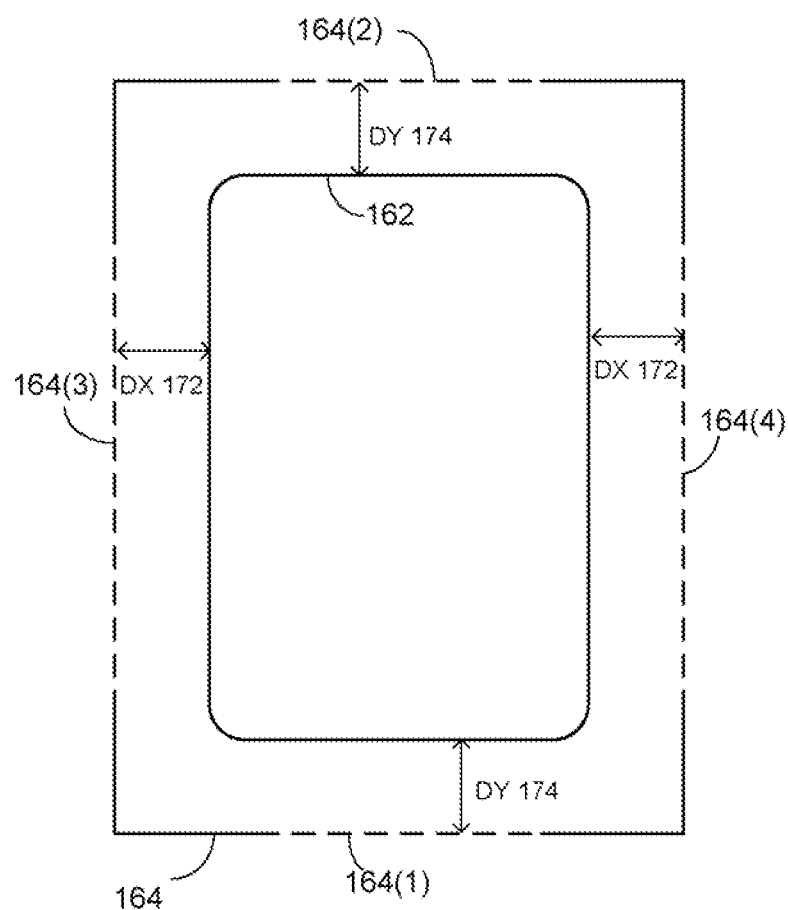
FIG. 9 illustrates a design contour and a simulated contour and their symmetrically biased portions according to an embodiment of the invention.

FIG. 9 illustrates design contour 164 and simulated contour 162. Design contour 164 has a rectangular shape. Simulated contour 162 is smaller than design contour 164 and has rounded edges.

An x-axis bias symmetry is illustrated by bias DX 172. Bias DX 172 appears between vertical portion 164(3) of design contour and a corresponding vertical portion of simulated contour 162. Bias DX 172 also appears between vertical portion 164(4) of design contour and a corresponding vertical portion of simulated contour 162.

A y-axis bias symmetry is illustrated by bias DY 174. Bias DY 174 appears between horizontal portion 164(2) of design contour and a corresponding horizontal portion of simulated contour 162. Bias DY 174 also appears between horizontal portion 164(1) of design contour and a corresponding horizontal portion of simulated contour 162.

Image processor 52 can utilize this symmetry when aligning the actual structural element contour with a simulated contour or with a design contour. It is expected that the same symmetrical bias will appear between an actual structural element contour and the simulated contour.

According to an embodiment of the invention, image processor 52 generates, during the alignment process, histograms of the distribution of spatial differences between points of at least a portion of the simulated contour and corresponding points of the aligned actual structural element contour. These histograms can provide information (such as most popular bias values) that is used to align the actual structural element contour with a simulated contour. Conveniently, separate histograms are calculated for the x-axis and y-axis. Conveniently, separate histograms are calculated for separate robust portions.

Figure 10:
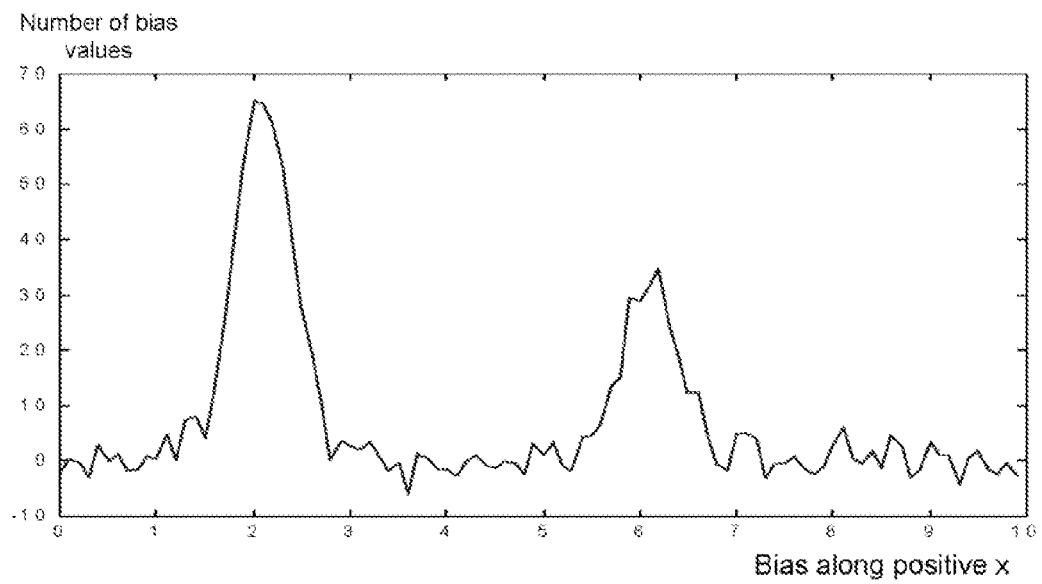
FIG. 10 includes two histograms according to an embodiment of the invention.
Figure 10:
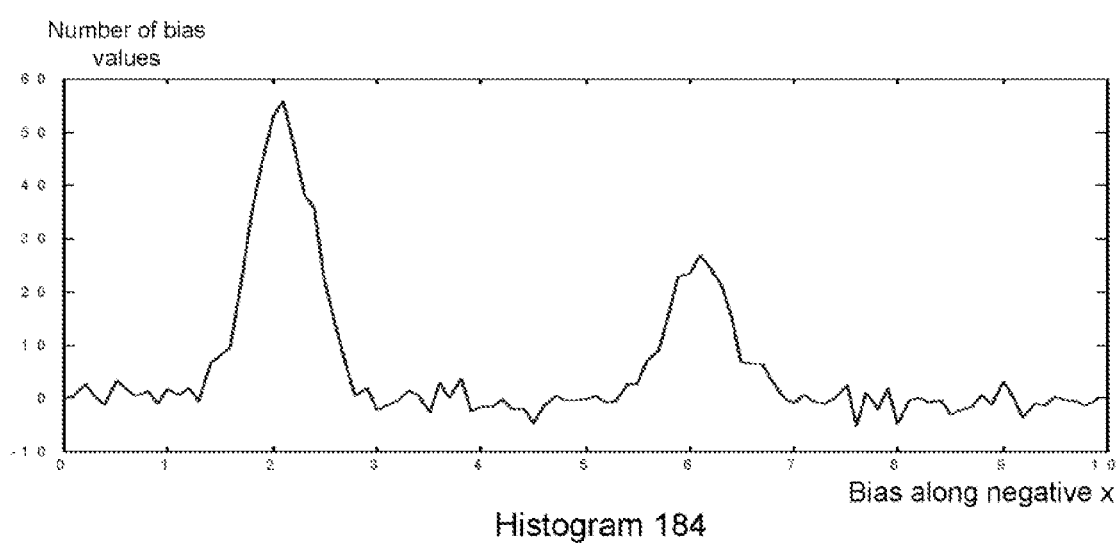

FIG. 10 illustrates histogram 182 that provides the relationship between positive x bias values and the occurrence (number of) bias values and also illustrates histogram 184 that provides the relationship between negative x bias values and the occurrence (number of) bias values. In both histograms, the bias of 2 nanometers is the most popular value.

According to yet another embodiment of the invention, the alignment process is not performed if image processor 52 determines that another actual structural element is close to the actual structural element such as to distort the actual structural element contour.

Figure 2:
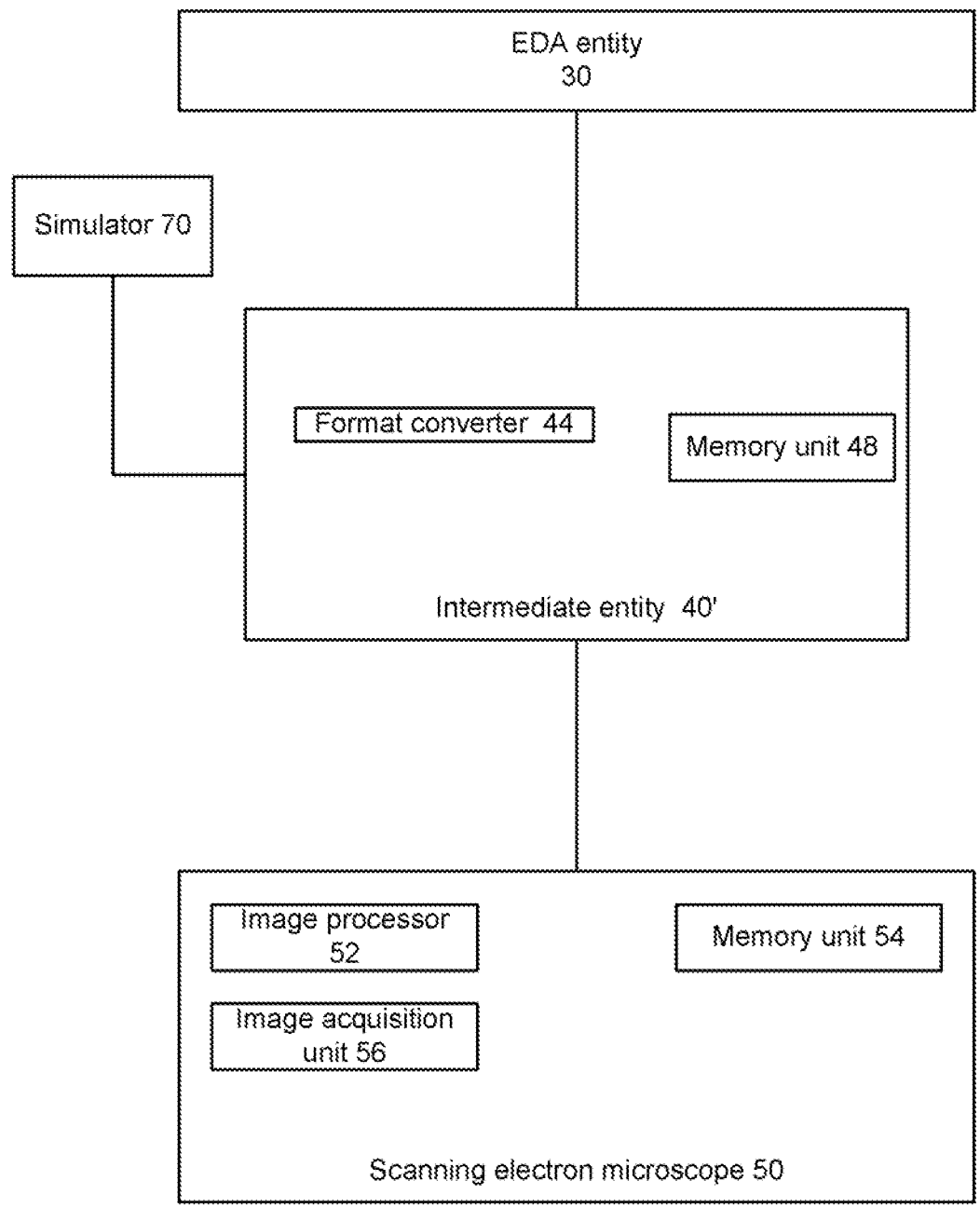
FIG. 2 illustrates an EDA entity, an intermediate entity, a simulator and an SEM, according to another embodiment of the invention.

FIG. 2 illustrates EDA entity 30, intermediate entity 40', simulator 70 and SEM 50, according to another embodiment of the invention.

Intermediate entity 40' of FIG. 2 differs from intermediate entity 40 of FIG. 1 by not including an OPC module 46 or a simulator 42. Simulator 70 provides simulated contours to intermediate entity 40'.

Figure 3:
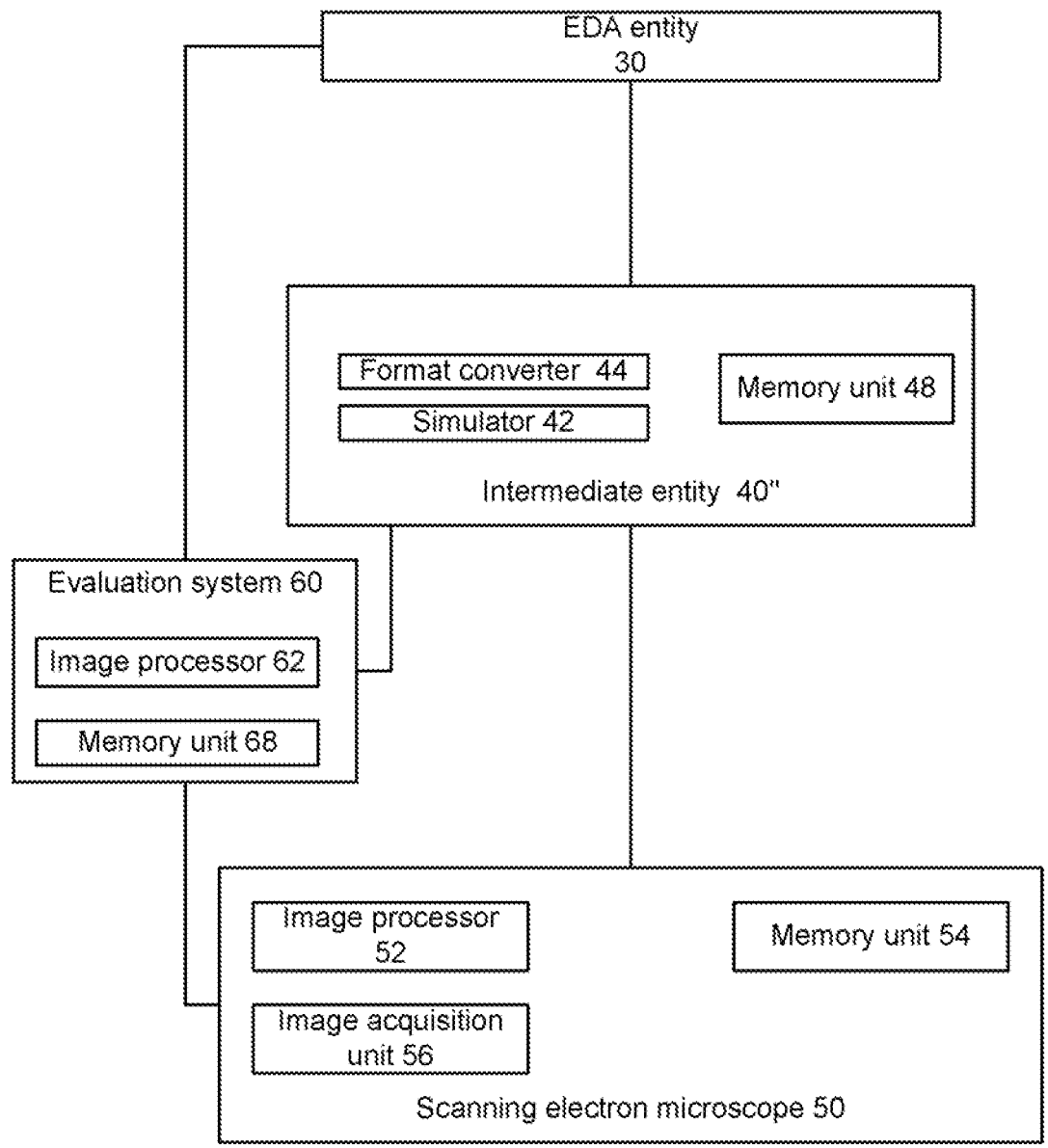
FIG. 3 illustrates an EDA entity, an intermediate entity, an evaluation system and an SEM, according to an embodiment of the invention.

FIG. 3 illustrates EDA entity 30, intermediate entity 40'', evaluation system 60 and SEM 50 according to an embodiment of the invention.

Intermediate entity 40'' includes memory unit 48, format converter 44 and simulator 42.

Evaluation system 60 can be a stand alone entity that receives one or more SEM images from SEM 50, design information from EDA entity 30, and additionally or alternatively, format converted design information from intermediate entity 40'' and/or simulation information. Evaluation system 60 includes image processor 62 and memory unit 68. It can perform various stages of method 300 and 302. It can, for example, (i) detect an actual structural element contour by processing a scanning electron microscope image of the actual structural element; (ii) align the actual structural element contour with a simulated contour to provide an aligned actual structural element contour; wherein the simulated contour is obtained by simulating a lithographic process that is responsive to a design contour; and (iii) compare between the aligned actual structural element contour and reference information. The reference information can be the design contour, and additionally or alternatively, the simulated contour.

Figure 4:
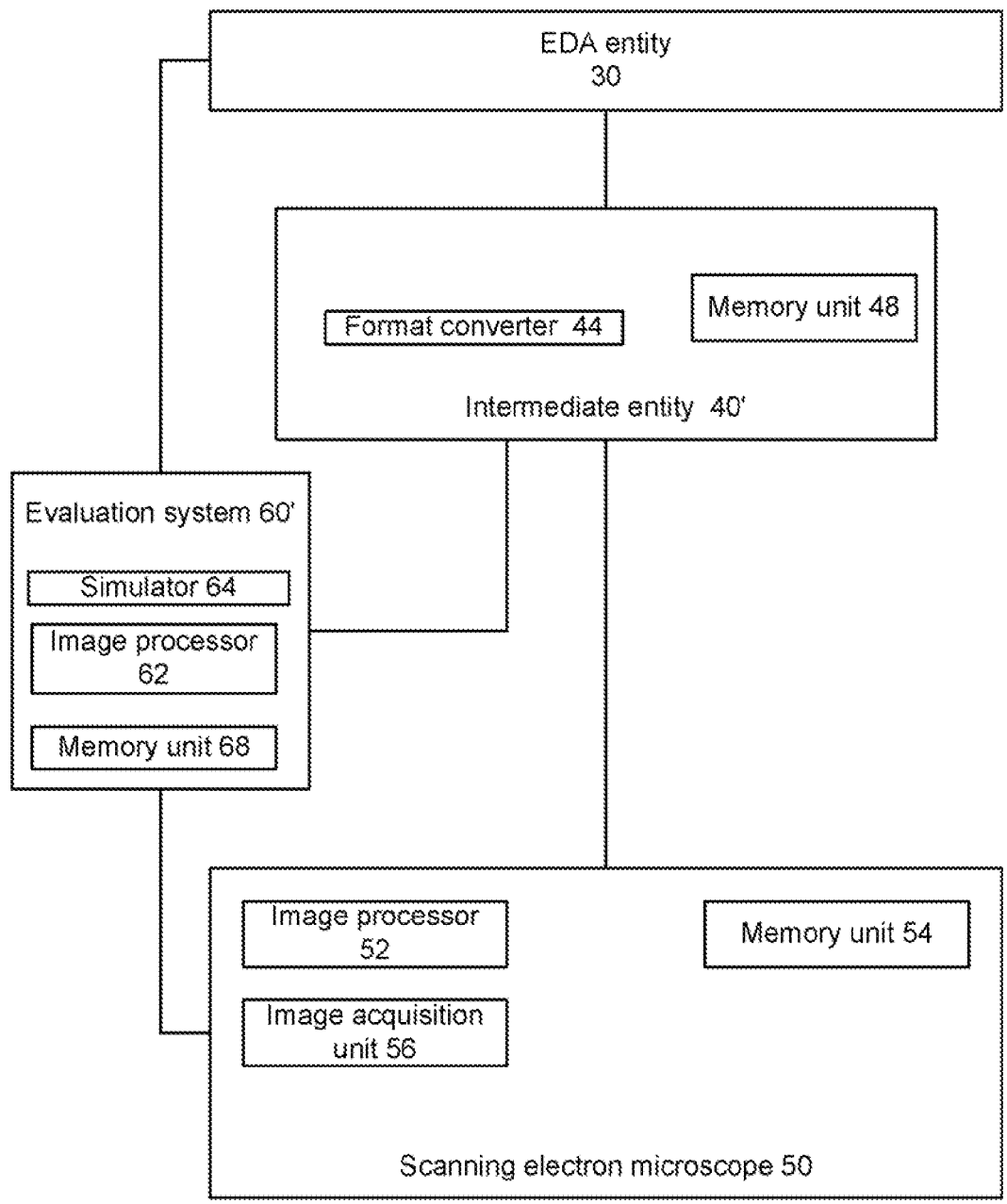
FIG. 4 illustrates an EDA entity, an intermediate entity, an evaluation system and an SEM, according to another embodiment of the invention.
Figure 5:
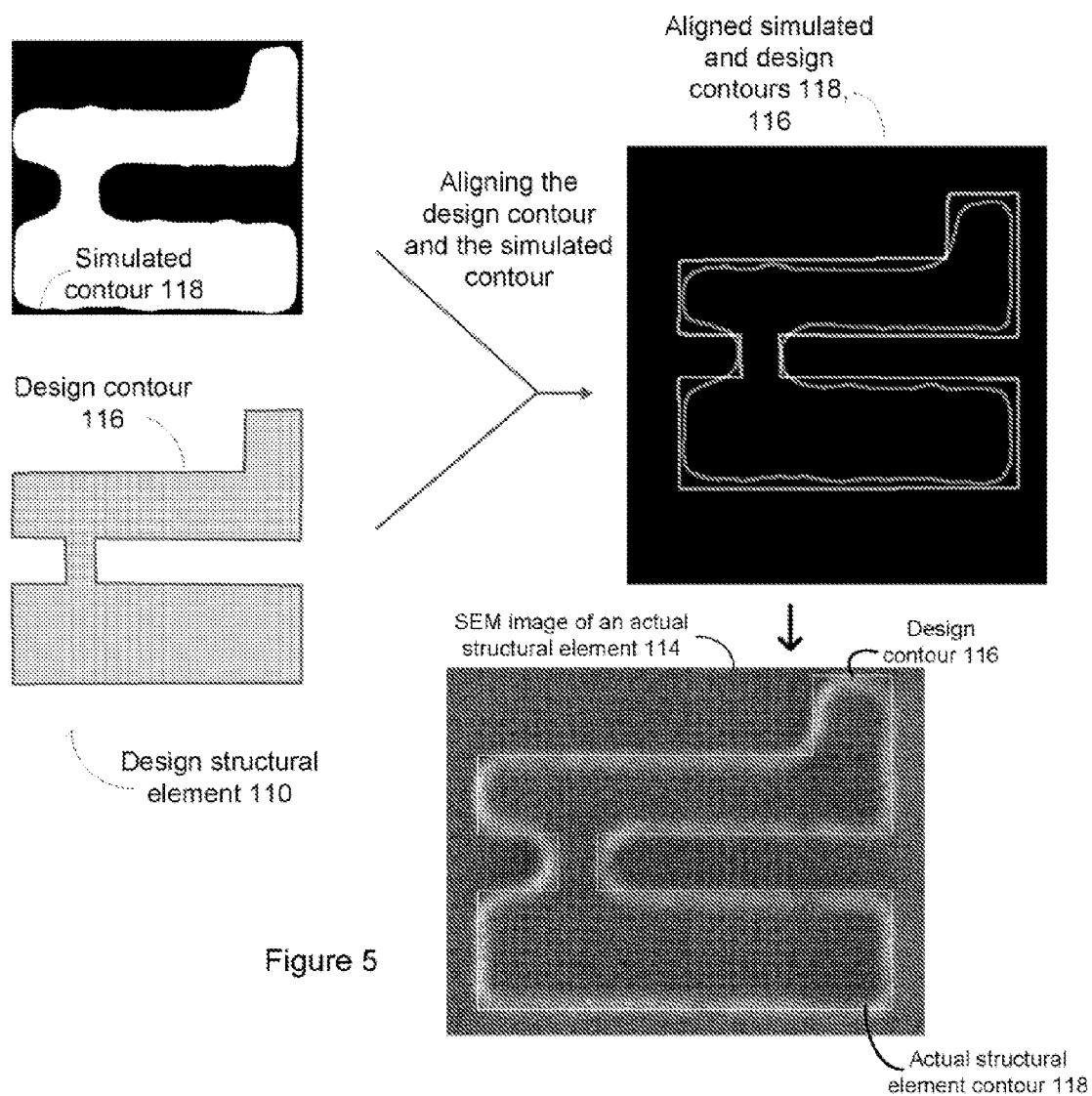
FIG. 5 illustrates an alignment of a simulated contour and a design contour.
Figure 6:
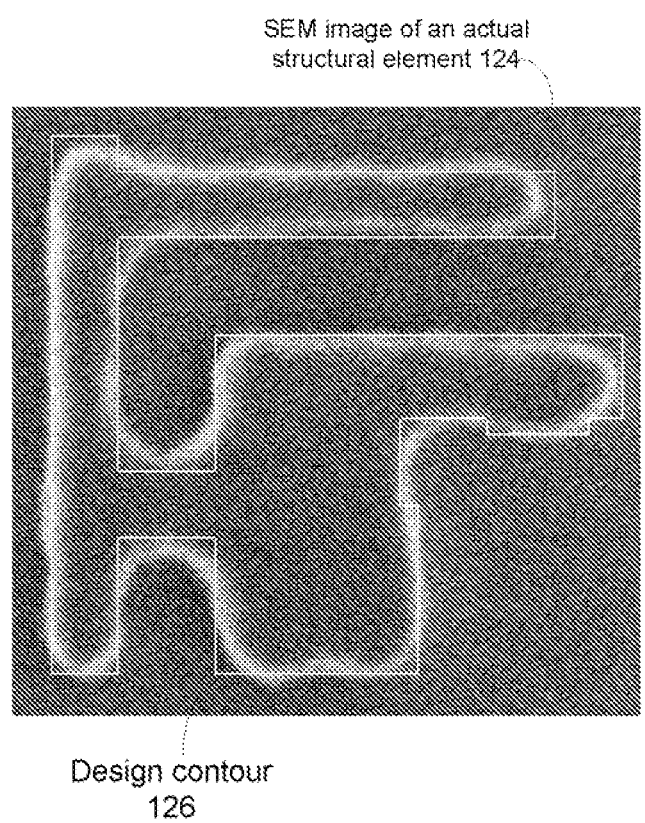
FIG. 6 illustrates an alignment of an actual structural element contour with a simulated contour according to an embodiment of the invention.

FIG. 4 illustrates EDA entity 30, intermediate entity 40', evaluation system 60' and SEM 50 according to an embodiment of the invention.

Intermediate entity 40' includes memory unit 48 and format converter 44.

Evaluation system 60' can be a stand alone entity that receives one or more SEM images from SEM 50, design information from EDA entity 30, and additionally or alternatively, format converted design information from intermediate entity 40'. Evaluation system 60' includes simulator 64, image processor 62 and memory unit 68. It can perform various stages of methods 300 and 302. It can, for example, (i) detect an actual structural element contour by processing a scanning electron microscope image of the actual structural element; (ii) align the actual structural element contour with a simulated contour to provide an aligned actual structural element contour; wherein the simulated contour is obtained by simulating a lithographic process that is responsive to a design contour; (iii) compare between the aligned actual structural element contour and reference information; and (iv) simulate a lithographic process that is responsive to a design contour.

FIG. 11 is a flow chart of method 300 according to an embodiment of the invention.

Method 300 starts by either one of stage 310 and 318. Stage 318 includes receiving a simulated contour. Stage 310 includes simulating a lithographic process that is responsive to a design structural element.

Stage 310 can include stage 312 of simulating a lithographic process that is responsive to a post optical proximity correction design contour.

Stage 310 and 318 are followed by stage 320 of detecting an actual structural element contour by processing a scanning electron microscope image of the actual structural element.

Stage 320 is followed by stage 330 of detecting at least one robust portion of the simulated contour. Stage 330 can include stage 332 of detecting at least one robust portion of the simulated contour by comparing between multiple simulated contours obtained during multiple simulations of the lithographic process; wherein different simulations of the lithographic process differ from each other by at least one simulation parameter.

Stage 330 is followed by stage 340 of aligning the actual structural element contour with a simulated contour to provide an aligned actual structural element contour; wherein the simulated contour is obtained by simulating a lithographic process that is responsive to a design contour.

Stage 340 of aligning can include at least one of stages 342, 344, 346, 348 or a combination thereof.

Stage 342 includes determining at least one spatial relationship between at least one robust portion of the simulated contour and at least one corresponding portion of the actual structural element contour.

Stage 344 includes aligning in response to symmetrical bias between a design contour and the simulated contour.

Stage 346 includes generating histograms of the distribution of spatial differences between points of at least a portion of the simulated contour and corresponding points of the aligned actual structural element contour.

Stage 348 includes aligning the actual structural element contour with a simulated contour in response to the histograms.

Stage 340 is followed by stage 380 of comparing between the aligned actual structural element contour and reference information.

FIG. 12 is a flow chart of method 302 according to another embodiment of the invention.

Method 302 can include ail stages of method 300 or only few of these stages. For simplicity of explanation FIG. 12 includes stages 320, 340 and 380.

Method 302 also includes stages 370 and 390. These stages allow one to skip the alignment process if an actual structural element is expected to be distorted by another actual structural element and this distortion can prevent an efficient alignment of the actual structural element contour with a simulated contour. Stage 370 includes determining if another actual structural element is close to the actual structural element such as to distort the actual structural element contour.

It is noted that an evaluation of an electrical circuit can include evaluating multiple actual structural elements. These actual structural elements can differ from each other or be ideally similar to each other. Each actual structural element can be evaluated by executing some or all of the stages of methods 300 or 302. For example, a certain iteration of method 300 can use the results of a previously executed stage 330.

If the answer is positive then stage 370 is followed by stage 390 of stopping the evaluation process. It is noted that in such case method 302 can start to evaluate a further actual structural element.

The following figures illustrate examples of embodiments of the invention. They are not intended to limit me scope of the invention but rather assist in understanding some of the embodiments of the invention. It is further noted that all the figures are out of scale.

Because the apparatus implementing the present invention is, for the most part, composed of electronic components and circuits, the design of which is, from the above, easily derivable for a person skilled in the art, circuit details will not be explained in any greater extent than that considered necessary as illustrated above, for the understanding and appreciation of the underlying concepts of the present invention and in order not to obfuscate or distract from the teachings of the present invention.

The term "coupled," as used herein, is not intended to be limited to a direct coupling or a mechanical coupling.

Also, devices functionally forming separate devices may be integrated in a single physical device.

However, other modifications, variations and alternatives are also possible. The specifications and drawings are, accordingly, to be regarded in an illustrative rather than in a restrictive sense.

The word 'comprising' does not exclude the presence of elements or steps other than those listed in a claim. Furthermore, the words 'a' and 'an' shall not be construed as limited to only one', but instead are used to mean 'at least one', and do not exclude a plurality. The mere fact that certain measures are recited in mutually different claims does not indicate that a combination of these measures cannot be used to advantage.

Those skilled in the art will readily appreciate that various modifications and changes can he applied to the embodiments of the invention as hereinbefore described without departing from its scope defined in and by the appended claims.

The invention claimed is:

1. A method of evaluating a structural element of an electrical circuit fabricated in a lithography process using a simulated contour of an element obtained by simulating a lithographic process that is responsive to a design contour corresponding to the structural element, the method comprising:

scanning the electrical circuit with a scanning electon microscope (SEM) to obtain an SEM image of the actual structural element;

identifying a robust portion of the simulated contour;

processing the SEM image to detect a contour of the actual structural element of the electrical circuit;

determining at least one spatial relationship between the robust portion of the simulated contour and a corresponding portion of the detected actual structural element contour;

aligning, with a processor, the detected actual structural element contour with the simulated contour using the at least one spatial relationship to provide an aligned actual structural element contour; and comparing the aligned actual structural element contour with reference information.

2. The method according to claim 1, wherein the reference information comprises the simulated contour.

3. The method according to claim 1, wherein the simulating is responsive to a post optical proximity correction design contour.

4. The method according to claim 1, wherein the reference information comprises the design contour.

5. The method according to claim 1, wherein the robust portion comprises a portion of the simulated contour that is not expected to substantially deviate due to simulation inaccuracies and/or a simulated portion contour that corresponds to an actual structural element portion that is expected to be insensitive or have low sensitivity to lithographic process parameter changes.

6. The method according to claim 1, wherein the robust portion of the simulated contour is identified by comparing between multiple simulated contours obtained during multiple simulations of the lithographic process, wherein different simulations of the lithographic process differ from each other by at least one simulation parameter.

7. The method according to claim 1, further comprising simulating a lithographic process that is responsive to a design structural element.

8. The method according to claim 1, further comprising receiving the simulated contour.

9. The method according to claim 1, wherein the aligning is responsive to symmetrical bias between the design contour and the simulated contour.

10. The method according to claim 1, further comprising generating histograms of a distribution of spatial differences between points of at least a portion of the simulated contour and corresponding points of the aligned actual structural element contour; and aligning the actual structural element contour with the simulated contour in response to the histograms.

11. The method according to claim 1, further comprising determining when another actual structural element is close to the actual structural element such as to distort the actual structural element contour.

12. A computer program product comprising a non-transitory computer readable medium having a computer readable program, wherein the computer readable program, when executed on a computer, causes the computer to perform a method of evaluating a structural element of an electrical circuit fabricated in a lithography process using a simulated contour of an element obtained by simulating a lithographic process that is responsive to a design contour corresponding to the structural element, the method comprising:

scanning the electrical circuit with a scanning electon microscope (SEM) to obtain an SEM image of the actual structural element;

identifying a robust portion of the simulated contour;

processing the SEM image to detect a contour of the actual structural element of the electrical circuit;

determining at least one spatial relationship between the robust portion of the simulated contour and a corresponding portion of the detected actual structural element contour;

aligning, with a processor, the detected actual structural element contour with the simulated contour using the at least one spatial relationship to provide an aligned actual structural element contour; and comparing the aligned actual structural element contour with reference information.

13. The computer program product according to claim 12, wherein the reference information comprises the simulated contour.

14. The computer program product according to claim 12, wherein the computer readable program further causes the computer to obtain the simulated contour by simulating the lithographic process, wherein the simulating is responsive to a post optical proximity correction design contour.

15. The computer program product according to claim 12, wherein the reference information comprises the design contour.

16. The computer program product according to claim 12 wherein the robust portion comprises a portion of the simulated contour that is not expected to substantially deviate due to simulation inaccuracies and/or a simulated portion contour that corresponds to an actual structural element portion that is expected to be insensitive or have low sensitivity to lithographic process parameter changes.

17. The computer program product according to claim 12, wherein the robust portion of the simulated contour is identified by comparing between multiple simulated contours obtained during multiple simulations of the lithographic process, wherein different simulations of the lithographic process differ from each other by at least one simulation parameter.

18. The computer program product according to claim 12, wherein the computer readable program further causes the computer to simulate a lithographic process that is responsive to a design structural element.

19. The computer program product according to claim 12, wherein the computer readable program further causes the computer to receive the simulated contour.

20. The computer program product according to claim 12, wherein the computer readable program further causes the computer to align the actual structural element contour with the simulated contour in response to symmetrical bias between the design contour and the simulated contour.

21. The computer program product according to claim 12, wherein the computer readable program further causes the computer to generate histograms of a distribution of spatial differences between points of at least a portion of the simulated contour and corresponding points of the aligned actual structural element contour; and align the actual structural element contour with the simulated contour in response to the histograms.

22. The computer program product according to claim 12, wherein the computer readable program further causes the computer to determine when another actual structural element is close to the actual structural element such as to distort the actual structural element contour.

23. A system comprising:
a memory unit adapted to store reference information; and
a processor adapted to perform a method of evaluating a structural element of an electrical circuit fabricated in a lithography process using a simulated contour of an element obtained by simulating a lithographic process that is responsive to a design contour corresponding to the structural element, the method comprising:

scanning the electrical circuit with a scanning electon microscope (SEM) to obtain an SEM image of the actual structural element;

identifying a robust portion of the simulated contour;

processing the SEM image to detect a contour of the actual structural element of an electrical circuit by processing a scanning electron microscope image of the actual structural element of the electrical circuit;

determining at least one spatial relationship between the robust portion of the simulated contour and a corresponding portion of the detected actual structural element contour;

aligning, with the processor, the detected actual structural element contour with the simulated contour using the at least one spatial relationship to provide an aligned actual structural element contour, wherein the simulated contour is obtained by simulating a lithographic process that is responsive to a design contour; and comparing the aligned actual structural element contour with the reference information.

24. The system according to claim 23, wherein the reference information comprises the simulated contour.

25. The system according to claim 23, wherein the processor is further adapted to obtain the simulated contour by simulating the lithographic process, wherein the simulating is responsive to a post optical proximity correction design contour.

26. The system according to claim 23, wherein the memory unit stores reference information that comprises the design contour.

27. The system according to claim 23, wherein the robust portion comprises a portion of the simulated contour that is not expected to substantially deviate due to simulation inaccuracies and/or a simulated portion contour that corresponds to an actual structural element portion that is expected to be insensitive or have low sensitivity to lithographic process parameter changes.

28. The system according to claim 23, wherein the robust portion of the simulated contour is identified by comparing between multiple simulated contours obtained during multiple simulations of the lithographic process, wherein different simulations of the lithographic process differ from each other by at least one simulation parameter.

29. The system according to claim 23, wherein the processor is further adapted to simulate a lithographic process that is responsive to a design structural element.

30. The system according to claim 23, wherein the processor is further adapted to receive receives the simulated contour.

31. The system according to claim 23, wherein the processor is further adapted to align the actual structural element contour with the simulated contour in response to symmetrical bias between the design contour and the simulated contour.

32. The system according to claim 23, wherein the processor is further adapted to generate histograms of a distribution of spatial differences between points of at least a portion of the simulated contour and corresponding points of the aligned actual structural element contour; and align the actual structural element contour with the simulated contour in response to the histograms.

33. The system according to claim 23, wherein the processor is further adapted to determine when another actual structural element is close to the actual structural element such as to distort the actual structural element contour.

* * * * *